United States Patent [19]
Versprille et al.

[11] Patent Number: 5,985,150
[45] Date of Patent: Nov. 16, 1999

[54] PROCESS FOR THE AEROBIC BIOLOGICAL PURIFICATION OF WATER

[75] Inventors: Abraham Izaak Versprille, Overveen; Dirk Jan Koot, Haarlem, both of Netherlands

[73] Assignee: Biothane Systems International B.V., Delft, Netherlands

[21] Appl. No.: 08/632,221

[22] Filed: Apr. 15, 1996

[30] Foreign Application Priority Data

Jul. 11, 1995 [EP] European Pat. Off. ............ 95201905

[51] Int. Cl.⁶ .................................................. C02F 3/26
[52] U.S. Cl. ..................... 210/626; 210/627; 210/630; 210/903
[58] Field of Search ................... 210/629, 195.4, 210/605, 626, 903, 630, 627, 624

[56] References Cited

U.S. PATENT DOCUMENTS

| | | | |
|---|---|---|---|
| 3,642,615 | 2/1972 | Wieferig | 210/195.4 |
| 4,374,730 | 2/1983 | Braha et al. | 210/195.4 |
| 4,392,955 | 7/1983 | Soriente | 210/195.4 |
| 4,950,396 | 8/1990 | Skaar et al. | 210/195.4 |
| 5,549,818 | 8/1996 | McGrew, Jr. | 210/195.4 |

*Primary Examiner*—Thomas G. Wyse
*Attorney, Agent, or Firm*—Panitch, Schwarze, Jacobs & Nadel, P.C.

[57] ABSTRACT

The invention is directed to a process for the aerobic purification of waste water in a reactor containing unsupported granular active sludge. The oxygen necessary for maintaining aerobic conditions within the reactor is provided in the form of an oxygen-containing gas. The oxygen-containing gas is preferably introduced into the reactor at such a place that the oxygen-containing gas provides at least some mixing action in the reactor. The invention also provides a reactor suitable for this process.

16 Claims, 1 Drawing Sheet

PROCESS FOR THE AEROBIC BIOLOGICAL PURIFICATION OF WATER

FIELD OF THE INVENTION

The present invention is directed to a process for the aerobic biological purification of water in a reactor containing active sludge. More in particular, the invention is directed to purifying drinking water, process water, and, most importantly, waste water.

BACKGROUND OF THE INVENTION

In European patent application 24758, a process for oxidative biological purification of waste water is disclosed, whereby the waste water flows in an upward direction through an oxidation chamber in which microorganisms are present, attached to an insoluble carrier. The function of the carrier is to support the active sludge by providing a surface for sludge to grow on and/or to increase the density of the sludge-carrier particle. Separation of the purified waste water from the supported active sludge takes place at the top of the reactor and separated sludge is returned to the reactor.

In these type of reactors, also known as airlift reactors, movement of the suspension in the oxidation reactor is provided by introduction of oxygen, air or oxygen enriched air. At the top of the oxidation chamber the three phase mixture, consisting of water, gas and supported sludge is separated in a three phase separator.

Part of the recirculating waste water is separated from the supported activated sludge and is removed from the reactor as effluent. All, or at least a majority of the sludge is recirculated to the reactor, usually in a compartment in which there is a downward flow. This may be, but is not necessarily an anaerobic or anoxic zone.

It is an object of the invention to provide an improved process or system for the aerobic purification of waste water of the type described herein above.

SUMMARY OF THE INVENTION

The present invention is directed to a process for the aerobic biological purification of waste water in a reactor containing unsupported granular active sludge. The process comprises the steps of introducing waste water and a first gas containing oxygen into the reactor, where the first gas is introduced into the reactor at such a place that the first gas provides a mixing action, also called a turbulence, within the reactor. The method also comprises removing purified waste water from the reactor.

Another aspect of the invention is a reactor that is useful in the above-summarized process. The reactor provides for the aerobic purification of waste water, and comprises at least one first zone and means for creating an upward flow of waste water through the first zone, and at least one second zone having a downward flow of waste water through the second zone. The reactor also has means for transferring the waste water from the first zone to the second zone at the top of the reactor, and means for transferring the waste water from the second zone back to the first zone at the bottom of the reactor. In addition, the reactor has a separator, preferably a three-phase separator, located in the second zone, where the separator has means for recirculating separated sludge by gravity to the second zone and means for removing water free from sludge. The reactor further has means for aerating, mixing and transporting waste water in the first zone.

BRIEF DESCRIPTION OF THE DRAWINGS

The foregoing summary, as well as the following detailed description of the preferred embodiment of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE PREFERRED EMBODIMENTS

Figure 1:
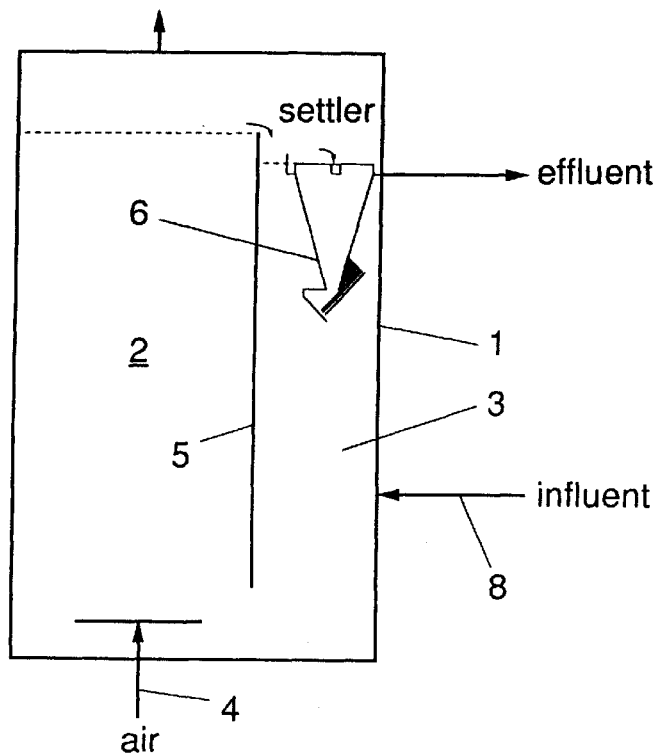
FIG. 1 is a schematic drawing of a preferred reactor of the invention including a separator.

The present invention is directed to a process for the aerobic biological purification of water in a reactor containing unsupported granular active sludge, the oxygen necessary for maintaining aerobic conditions being provided in the form of an oxygen containing gas at such a place in the reactor that the oxygen-containing gas at least partly provides for the necessary mixing action in the reactor.

The present invention is based on the surprising discovery that the use of unsupported granular sludge is possible in an airlift reactor for aerobic biological purification. One of the important advantages of the use of unsupported granular sludge lies in the absence of the need to continuously supply a support material to the reactor, which is important in view of the cost of the material and the handling, and the ease in the further processing of the excess sludge. In addition thereto it can be remarked that the use of unsupported granular sludge generally improves the purification efficiency of the reactor, which leads to the possibility of using smaller reactor systems. Adhesion of the sludge to the support, which may present problems with certain types of sludge, no longer plays a role. Further, it is to be noted that the energy required for suspending and mixing the sludge is generally less than the amount of energy necessary in the conventional systems based on sand, glass or basalt. Finally the use of unsupported sludge has the distinct advantage that the unsupported sludge gives rise to less erosion of the equipment.

The present invention is in the area of the aerobic, biological purification of water, preferably waste water such as industrial and/or domestic waste water. Depending on the impurities present in the waste water, and in particular the presence of nitrogenous impurities, either a conventional biological oxidation of organic impurities to carbon dioxide and water is provided for or also nitrification, optionally a combination with denitrification in an anoxic zone of the reactor is possible. Depending on the type of waste water, the composition of the micro-organisms in the unsupported granular sludge will vary.

An important aspect of the present invention is the use of unsupported granular sludge. As is well-known in the art, unsupported granular sludge comprises biologically active sludge granules containing either no or substantially no externally added support material, and having a density greater than about 1000 kg/m$^3$. There are various ways of making sure that the sludge in a reactor is unsupported. An easy way is to start-up an installation with supported aerobic sludge and let this sludge gradually become unsupported by simply recirculating only a part of the sludge and not supplying any support material to the reactor. Due to the growth of micro-organisms in the course of time the amount of support will gradually decrease. In the alternative, one can take an amount of granular anaerobic sludge from an existing system. Generally this sludge will then become gradually aerobic due to increase of the amount of aerobic micro-organisms.

Of course it is also possible, once one or more installations using the process of the present invention have become operational, to use unsupported, aerobic granular sludge from such an installation to start-up a new installation.

Once the system is operating properly under steady-state conditions, no specific actions are necessary to keep the sludge in a proper condition. In this respect it is preferred to keep the mean residence time of the water in the system within the range of 0.3 to 20 hours, preferably between 0.5 and 10 hours, and most preferred between 0.5 and 5 hours.

In this respect it is to be noted that the term "unsupported" does not exclude the presence of minor, solid impurities in the granular sludge. Due to its very nature, waste water may be contaminated with sand or other small solid particles, which might be captured by the sludge. However, the granular unsupported sludge may be characterized by the fact that no, or substantially no, separate solid support particle is present in the majority of the granules. No external support is added during the process.

In order to operate properly, it is preferred that the amount of sludge present in the reactor range from about 5 to about 100 kg/m$^3$, preferably from about 15 to about 60 kg/m$^3$. The sludge is suspended in the liquid and is kept in suspension mainly by introduction of an oxygen-containing gas at an appropriate place in the reactor, usually at the bottom of the aerobic zone. This oxygen-containing gas is preferably air, oxygen or oxygen enriched air, and most preferably is air.

The reactor is generally divided into at least two zones, which zones are connected to each other at the top and the bottom, whereby in at least one of said zones, denoted the first zones, the waste water has an upward velocity due to the action of the oxygen-containing gas, and whereby at the top of the first zones the suspension flows into at least one second zone, wherein the waste water has a downward velocity. The second zones may be operated at very low dissolved oxygen concentration, but this is not necessarily the case.

In the prior art it is customary to recirculate the waste water from one zone to another in such a way that it flows over the top of the separation wall between the two zones. In such a situation the rate of recirculation increases almost exponentially with the increase in the water level, once it has risen to a level above the top of the separation wall.

The reactor of the present invention is provided with means for recirculating waste water from the first, also known as the aerobic zone, to the second zone, which means are preferably of such a construction that the rate of recirculation is approximately directly proportional to the level of water in the aerobic zone, when the level of water in the second zone is constant.

An easy way to construct a reactor that meets the criteria of directly proportional recirculation rate is to provide a separation wall which extends to a level above the usual water level in neighboring zones and to provide openings in the separation wall at a level below the level of the water in both zones, which openings have a sufficient cross-sectional area to provide a suitable recirculation.

It is also possible that the opening is below the water level in the first zone and above the water level in the second zone. The reactor is preferably provided with a separator, also sometimes called a settler, for example such as disclosed in EP-A 90,450, EP-A 311,215, EP-A 311,216 and/or EP-A 315,233. The entire disclosure of EP-A 315,233, which describes a preferred separator for use in the present invention, is incorporated herein by reference.

The separator provides for the gas, sludge and water to be separated from each other. The separated water is partly recirculated and partly removed as product water. The unsupported granular sludge will generally be recirculated for the major part, preferably to the second zone in which the waste water has a downward velocity. As the granular sludge may easily be disturbed by application of excessive shear forces, it is preferred to recirculate the sludge under the influence of gravity, for example using the system as disclosed in EP-A 24,758.

In a preferred embodiment, the separator is placed in the second zone of the reactor, wherein the waste water has a downward velocity. In order to prevent problems with capturing of air in the downward flowing water, it is preferred that the downward velocity of the waste water in this area will not exceed about 0.25 m/s, preferably not exceed about 0.20 m/s.

The actual construction of the separator, and in particular the number of partitions thereof (see feature 12 in FIG. 2) will depend at least partly on the gas load of the reactor. It has been found that in the application of the present type of separator, the number of partitions to be used should preferably be at least 1, whereas with gas loads of over 3 Nm$^3$/m$^2$.h the number of partitions should be $$P \geq 1 + \left\lfloor \frac{V - 3.0}{3} \right\rfloor$$

wherein P is the number of partitions, and V is the gas load of the separator, expressed as Nm$^3$/m$^2$.h.

According to one embodiment it may be advantageous to supply a gas, for example an oxygen-containing gas or nitrogen, to the second zone wherein the waste water has a downward velocity. This supplying of gas may, in case it is oxygen-containing, improve the purification efficiency of the system, together with improving the efficiency of the sludge separation.

According to a preferred embodiment, the waste water that recirculates from the aerobic zone to the second zone is partly introduced into the separator located in the second zone. It is preferred to direct the water flow in such a way that the waste water has an upward direction before it enters the separator. This has the unexpected and surprising advantage that the separation efficiency is greatly increased.

In order to obtain this upward flow of the waste water in the second zone wherein the flow is mainly downward, it is possible to provide an additional separation wall at some distance from the separation wall between the first and second zones, preferably substantially parallel thereto and extending to a level below the entrance of the separator, said additional partition wall creating a separate downward flow compartment.

In an alternative embodiment, the separator may be constructed in such a way that it creates a separate compartment for downward flow, for example, by extending the separator across the entire width of the downward flow compartment. It is to be noted that in customary systems, the separator is constructed in such a way that the water can pass around the separator and accordingly the water will have an upward flow when reaching the entrance of the separator.

According to the invention, the mixing and suspending of the granular unsupported sludge is at least partly provided for by the introduction of an oxygen-containing gas. However, it is also possible to introduce all or part of the waste water through the bottom of the reactor, whereby the upward flow thereof aids in suspending the sludge and mixing the system. Finally, the airlift system may be assisted by some mechanical mixing.

According to the invention, the residence time of the waste water is generally from about 0.2 to about 20 hours, whereas the temperature range is from about 5° C. to about 65° C., preferably from about 20° C. to about 45° C. The load of the reactor may be between about 0.2 and about 20 kg $COD/m^3$.d, optionally in combination with up to about 20 kg Kjehldal-$N/m^3$.d.

For a complete removal of both the organic as well as the nitrogen compounds, the COD/N ratio should preferably be at least 3. As the waste water to be purified will not always meet the minimum value it may be necessary to add an external COD source. This will depend mainly upon the degree to which the impurities have to be removed. Sometimes it may be useful to add nutrients to provide sufficient growth of sludge in the system. The external COD-source and/or nutrients can be added in various forms, such as solid, liquid or gaseous form. The COD-source can be added at various locations such as below the settler.

The invention is also directed to a reactor that is suitable for use in the process of the invention, the reactor comprising at least one first, also known as is aerobic, compartment provided with means for creating an upward flow of waste water, and at least one second compartment for downward flow of waste water, said compartments being provided with means for recirculating the waste water from the aerobic compartment to the second compartment at the top thereof and with means for recirculating the waste water from the second compartment to the aerobic compartment at the bottom thereof, and means for aerating, mixing and transporting waste water in the aerobic compartment. The reactor also comprises a separator, preferably placed in the compartment for downward flow, said separator having means for recirculating separated sludge by gravity to the compartment for downward flow and means for removing water free from sludge. A preferred reactor has a gap present between (a) the wall separating the first and second zone and (b) the wall of the separator.

According to a preferred embodiment, the separator is a three phase separator, whereas the means for recirculating the waste water from the aerobic compartment to the second compartment may be provided by openings in a separation wall between the aerobic compartment and the second compartment.

When applying the embodiment, wherein the waste water has an upward flow when entering the three phase separator, an additional separation wall is present between the means for recirculating the waste water from the aerobic compartment to the second compartment and the separator.

The reactor to be used in the present invention preferably has the separator in the second zone, i.e., the compartment with downward water velocity. The main advantage thereof is that the function of the separator is not, or almost not, disturbed by the large amount of air which is brought into the reactor. Furthermore, by restricting the downward velocity as indicated above, the action of the separator is improved because the liquid flow in the second compartment will not be hampered by gas, resulting in lower energy use.

The reactor to be used in the present invention preferably has a ratio of reactor height to reactor diameter of at least about 0.5, more preferably the ratio is from about 1 to about 25, and most preferably the ratio is from about 2 to about 5.

In FIG. 1 a reactor 1 is shown, having two compartments or zones, 2 and 3. At the bottom of compartment 2, air is introduced through 4. The mixture of gas, sludge and waste water has an upward flow in compartment 2 due to the airlift action of the air introduced in the bottom. The mixture of gas, sludge and waste water flows over the upper rim of the separation wall 5 between the two compartments 2 and 3. In the alternative it may flow through suitable openings provided in the wall 5 at a level below the water level in both compartments. It is also possible that the opening is below the water level in the first zone and above the water level in the second zone.

In compartment 3 a three phase separator 6 has been provided, which separator separates gas, sludge and water. Part of the water, which is substantially free from suspended sludge, is removed from the reactor 1 as effluent.

The sludge is removed from separator 6 and is returned to the reactor in compartment 3. The sludge and the waste water have a downward flow in this compartment 3. In compartment 3, the waste water is introduced through line 8. The resulting mixture flows to compartment 2 underneath the separation wall 5. It is to be remarked that alternatively the waste water may be introduced in compartment 2.

Figure 2:
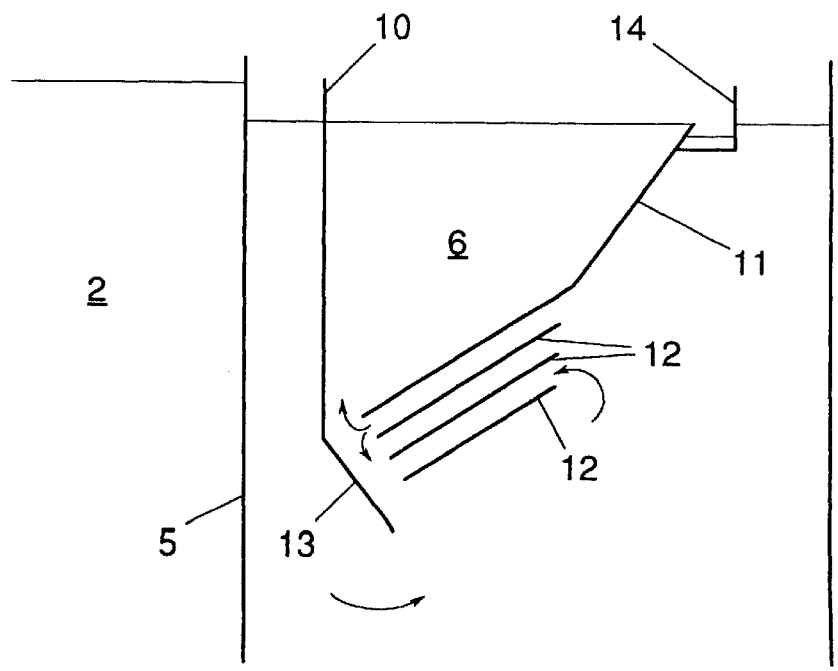
FIG. 2 is a schematic drawing of an expanded view of the separator and nearby features of the reactor of FIG. 1.

In FIG. 2, a three-phase separator 6 suitable for use in the invention is illustrated. Separator 6 is provided in the compartment having a downward flow of water.

The separator 6 has a chamber 15 bounded by walls 10 and 11, of which wall 10 extends across the compartment, forcing the gas/sludge/waste water flowing from compartment 2 to compartment 3 downward between separation wall 5 and compartment wall 10. The gas/sludge/water mixture flows along wall 10 and guide plate 13, and enters the separator 6 at the upper side (right-hand aide as shown in FIG. 2) of the partitions 12. The mixture flows in a downward direction between the partitions, during which time the gas separates from the gas/sludge/water mixture. At the lower end of the partitions (12) (left-hand side as shown in FIG. 2) already a first separation takes place between sludge on the one hand and water/reBidual gas an the other hand. At least part of the sludge moves downward due to gravitational forces along the inner side of guide plate 12 and is returned to compartment 3. The remainder of the sludge-containing mixture travels upward and enters the chamber 15.

The effluent is recovered from the separator as it flows over the top of wall 11 into final effluent collection trough 14, from where it is removed from the reactor. The ns gas is collected in the overhead gas chamber and removed from the reactor (see FIG. 1).

The invention will now be illustrated in more detail by the following non-limiting example, which demonstrates the advantageous properties of the present invention.

EXAMPLE

Waste water having a COD content of 725 mg/l and a flow of 100 $m^3$/h was introduced in a system as illustrated in FIG. 1, having a settler as in FIG. 2. The reactor height was 9.0 m and its capacity was 200 $m^3$. The residence time was 2 hours and the reactor load was 8.7 kg $COD/m^3$.d. The concentration of unsupported suspended granular sludge in the reactor was about 400 m/l, or about 35 g/l.

In order to oxidize the COD introduced into the reactor, 2500 $m^3$/h of air is required. This amount results in a residence time in compartment 2 of 6 minutes with an upward velocity of 90 m/h. In compartment 3, and particularly in the channel formed by the separation wall 5 and the separator wall 10, the downward velocity was about 0.18 m/s. The upward velocity of the water in the separator 6 was about 14 m/h.

From the separator, purified water was recovered having a COD content of 50 mg/l. The oxygen content of the gas recovered from the overhead gas compartment was 19% by volume.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for the aerobic biological purification of waste water, the process comprising:

introducing waste water to a reactor containing unsupported granular sludge, introducing a first gas containing oxygen into the reactor at such a place that the first gas provides a mixing action within the reactor to suspend the unsupported granular active sludge, moving the waste water with an upward velocity in at least one first zone and with a downward velocity in at least one second zone of the reactor, the at least one first zone and the at least one second zone being in fluid communication both at the top and at the bottom of the reactor, continuously separating purified water from the granular sludge with a separator located inside of and in fluid communication with the reactor, removing purified waste water from the reactor, and at least partly recirculating the granular sludge.

2. The process according to claim 1, wherein the sludge is present in the reactor in an amount of from about 5 to about 100 kg/m$^3$.

3. The process according to claim 1, wherein the sludge is present in the reactor in an amount of from about 15 to about 60 kg/m$^3$.

4. The process according to claim 1, wherein the first gas is selected from the group consisting of oxygen, air and oxygen-enriched air.

5. The process according to claim 1 wherein at least one second zone is operated under anoxic conditions.

6. The process according to claim 1 wherein the upward velocity is at least partly provided by the introduction of the first gas.

7. The process according to claim 1 wherein the unsupported granular sludge is recirculated back into a second zone.

8. The process according to claim 7, wherein the unsupported granular sludge is recirculated under the influence of gravity.

9. The process according to claim 1, wherein the waste water containing unsupported granular sludge has an upward velocity as it enters the separator.

10. The process according to claim 1 wherein the downward velocity of the waste water in the second zone does not exceed about 0.25 m/s.

11. The process according to claim 1, wherein the downward velocity of the waste water in the second zone does not exceed about 0.20 m/s.

12. The process according to claim 1, wherein a second gas is supplied to at least one second zone.

13. The process according to claim 12, wherein the second gas is an oxygen-containing gas.

14. The process according to claim 1, wherein the waste water has a first height in a first zone and a second height in a second zone and wherein the reactor is constructed in such way that the waste water recirculates at a rate approximately directly proportional to the difference between the first and second heights.

15. The process according to claim 1, wherein the separator is a three-phase separator.

16. The process according to claim 1, wherein the separator is located within the at least one second zone of the reactor.

* * * * *